United States Patent [19]

Gunter

[11] Patent Number: 5,040,886
[45] Date of Patent: Aug. 20, 1991

[54] MATCHING OPTICS FOR GAUSSIAN BEAMS

[75] Inventor: William D. Gunter, San Jose, Calif.

[73] Assignee: The United States of America as represented by the Administrator of the National Aeronautics and Space Administration, Washington, D.C.

[21] Appl. No.: 472,939

[22] Filed: Jan. 31, 1990

[51] Int. Cl.$^5$ .......................... G02B 23/00; G02B 3/00
[52] U.S. Cl. ................................. 359/572; 359/362; 359/744
[58] Field of Search .................. 350/453, 572–577, 350/319, 321, 500–506; 372/69, 75, 99–109, 108; 356/27, 28.5

[56] References Cited

U.S. PATENT DOCUMENTS

| | | | |
|---|---|---|---|
| 4,148,585 | 4/1979 | Bargeron et al. | 356/28.5 |
| 4,318,594 | 3/1982 | Hanada | 350/453 |
| 4,346,990 | 8/1982 | Rhodes | 350/453 |
| 4,697,922 | 10/1987 | Gunter, Jr. et al. | 350/572 |
| 4,705,367 | 10/1987 | Eckbreth et al. | 350/572 |
| 4,758,068 | 7/1988 | Aughton et al. | 350/321 |

FOREIGN PATENT DOCUMENTS 61-25120   2/1986   Japan .................................... 350/501

OTHER PUBLICATIONS

"Principle of Lasers", Second Edition, Svelto et al.—Plenum Press—2/1986; pp. 298–301.

Primary Examiner—Rodney B. Bovernick
Assistant Examiner—Thong Nguyen
Attorney, Agent, or Firm—Darrell G. Brekke; Harold W. Adams; John R. Manning

[57] ABSTRACT

A system of matching optics for gaussian beams. The matching optics system is positioned between a light beam emitter (such as a laser) and the input optics of a second optics system whereby the output from the light beam emitter is converted into an optimum input for the succeeding parts of the second optical system. The matching optics arrangement includes the combination of a light beam emitter, such as a laser with a movable afocal lens pair (telescope) and a single movable lens placed in the laser's output beam. The single movable lens serves as an input to the telescope. If desired, a second lens, which may be fixed, is positioned in the beam before the adjustable lens to serve as an input processor to the movable lens. The system provides the ability to choose waist diameter and position independently and achieve the desired values with two simple adjustments not requiring iteration.

9 Claims, 1 Drawing Sheet

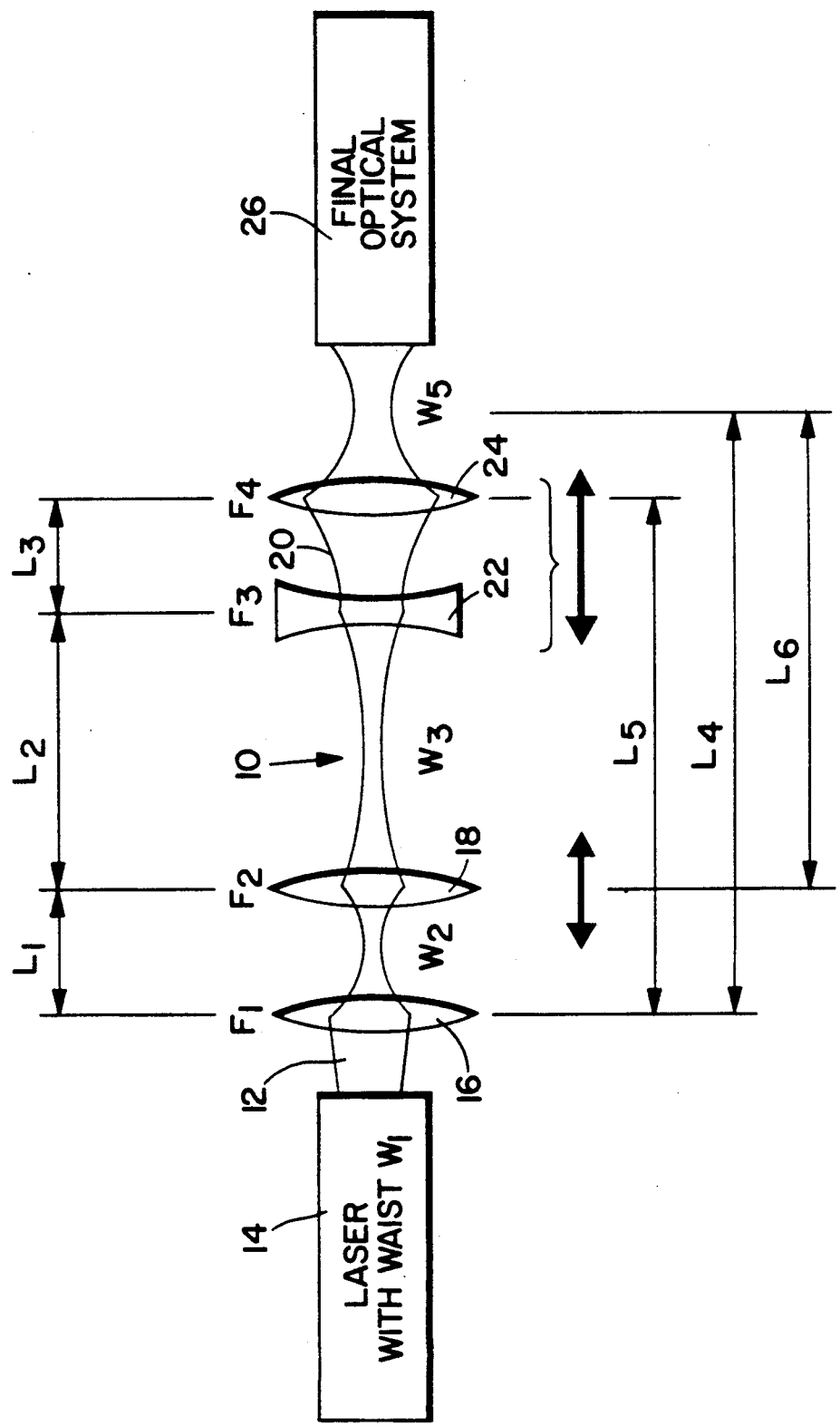

MATCHING OPTICS FOR GAUSSIAN BEAMS

ORIGIN OF THE INVENTION

The invention disclosed herein was made in the performance of work under a NASA Contract and is subject to Public Law 96-517 (35 U.S.C. §200 et seq.). The contractor has not elected to retain title in this invention.

FIELD OF THE INVENTION

The present invention is directed to an optical system comprised of an arrangement of optical elements which provide for matching the available gaussian input beam from a light beam emitter to the specific input requirements of some other optical system.

BACKGROUND OF THE INVENTION

In some prior art optical systems, when it was required to precisely match an input gaussian beam to the input requirements of an optical system, it was necessary to have two or more adjustable optical features in the design, and the optical elements required iterative adjustment as each adjustment of an individual optical element would affect the output waist diameter and the output waist location. Alternatively, another approach often taken was to give up on getting a really good match and to use a single adjustment to simultaneously change both waist size and waist location, but not independently.

Beam-shaping optical systems are well known in the art. U.S. Pat. No. 4,318,594 issued to Hiroshi Hanada on Mar. 9, 1982, discloses a beam-shaping optical system for treating or collimating the beam emitted from the exit surface of a semiconductor laser. U.S. Pat. No. 4,705,367, issued to Alan C. Eckbreth et al. on Nov. 10, 1987, is directed to a variable length optical system for generating a constant diameter focal spot.

A feature of applicant's invention, not found in the prior art, is the provision of a single movable lens in combination with a movable afocal pair (telescope) wherein the single movable lens serves as an input to the telescope to provide an optical system for matching the available gaussian input beam to the specific input requirements of some other optical system.

One example of such an optical system would be a system wherein the output of an argon laser is to be converted into the optimum input for the succeeding parts of a laser velocimeter system. Some laser velocimeter systems are disclosed in U.S. Pat. Nos. 4,148,585, issued on Apr. 10, 1979, to Bargeron et al.; 4,346,990, issued on Aug. 31, 1982, to Rhodes; and 4,697,922, issued on Oct. 6, 1987, to Gunter et al.

In such velocimeter systems, a relatively long "stack" of beam processing components, such as beam splitters (spacers), Bragg cells, etc., are used, and it is necessary to keep the beam small enough to negotiate the various apertures in the stack. The optical system of the present invention provides such capabilities.

SUMMARY OF THE INVENTION

Accordingly, it is an object of the present invention to provide matching optics for gaussian beams wherein the output is adjustable to provide an optimum input to an arbitrary optical system.

A feature of the invention is that proper selection of the output waist diameter and position is independently achieved by two simple adjustments not requiring iteration.

Other objects and advantages of the present invention is achieved by the combination of an afocal lens pair (telescope) with a single movable lens serving as input to the afocal lens pair and possibly using a fixed lens which serves as an input processor to the movable lens. One application of the invention is the combination with a laser velocimeter wherein the output serves as a matching input for the velocimeter.

BRIEF DESCRIPTION OF THE DRAWING

The single drawing is a schematic representation of the matching optics system of the present invention.

DESCRIPTION OF THE PRESENT EMBODIMENT

As shown in the drawing, a matching optics system 10 is shown positioned between a light beam emitter, such as a laser 14, (for example, an Argon laser), and a second or final receiver optical system 26. The term "matching optics" as used herein defines an optical system which is positioned between the output of the light beam emitter and a receiver optical system to "match" the available gaussian output from the light emitter to the specific input requirements of the receiver optics by providing a waist having a predetermined diameter and position relative to the input optics of the receiver optical system. The matching optics system of the present invention may include a positive lens 16 (having a focal length F1) placed at a position along the beam near the laser. Lens 16 may be fixed, if desired, and is used to transform the laser waist diameter of its confocal parameter (which is related to waist diameter).

A second positive lens 18, whose position can be adjusted (translated) along the beam, is positioned next along the beam. It is convenient if the range of adjustment includes the position placing the lens approximately its own focal length, F2, beyond the waist, W2, formed by lens 16 (which is the region in which the diameter of the lens's output waist varies most rapidly for a given amount of adjustment of the lens along the beam). Following the adjustable lens, an afocal (parallel light in yields parallel light out in the geometric optics approximation) telescope 20 is placed in the beam. Of course, an afocal pair means that two lenses or other focusing elements are separated by a distance equal to the algebraic sum of their focal lengths.

It is known that if the input lens 22 of telescope 20 has a focal length F3 and the output lens 24 has a focal length F4, the magnification of the telescope is $M = (F4/F3)$. If W3 is the diameter of the input waist to the telescope and W5 is the diameter of the output waist from the telescope, $W5/W3 = M$.

However, a little known fact here is that $W5/W3 = M$ regardless of the distance that the input waist, W3, is from the telescope. This is quite different from the geometric optics results for afocal lens pairs and much simpler than expected from the complicated equation for transformation of a gaussian waist by a single lens.

The distance between different lenses and the output waist is shown in the drawing wherein L1 = the distance between lens 16 and lens 18, L2 = the distance between lens 18 and lens 22, L3 = the distance between lens 22 and lens 24, L4 = the distance between lens 16 the output waist W5. Further, the distance of waist W5 from lens F4 is L4 minus L5. If, for example, the distance L2 is decreased by one unit (by moving telescope 20 one unit closer to lens 18), the distance between lens 24 and output waist W5 will lengthen by $M^2$ units without changing the diameter of output waist W5. As telescope 20 has been moved one unit toward lens 18 this will, of course, cause the distance between lens 18 and output waist W5 to lengthen M squared minus one units $(M^2-1)$.

Obviously then, by sliding (translating) the afocal telescope along the beam, we can place its output waist anywhere along the beam that we wish since the distance between input and output waist changes. The change in position of the output waist will be $(M^2-1)$ times as much as the change in position of the telescope. If desired, one can generate negative distances between input and output waists. The diameter and location of W5 is chosen to match the input of the receiver optical system, indicated by the numeral 26 in the drawing. As stated previously, such an optical system may include the optical system of a velocimeter.

In operation, the single adjustable lens 18 is adjusted to make the output waist of the telescope be the desired size. Then, the telescope position is adjusted to bring the waist to a desired location. An example of the parameters of a matching system designed according to this invention is as follows.

The virtual waist W1 within a laser was taken to be 0.9 mm in diameter, and the first lens 16 (F1, 200 mm focal length) was placed 1,200 mm from the position of the laser's virtual waist. This put that lens quite close to the output end of the laser. The second lens 18 (F$_2$, 100 mm focal length) was placed anywhere from 325 to 345 mm from lens 16. An afocal telescope 20 (F3, -52.45 mm focal length, and F4, 200 mm focal length) came next, with the distance between lens 22 and lens 24 equal to 147.55 mm. The distance from lens 18 to the input lens 22 of the telescope was varied from 50 mm to 350 mm.

Assuming a 500 mm wavelength for the light, the calculated diameter of output waist W5 varied from 1.952 mm to 1.194 mm as the distance between lens 16 and 18 was varied from 325 mm to 345 mm.

The location of the output waist W5 changed by several meters as the position of the telescope was changed without affecting the waist diameter previously set by the position of lens 18.

In some cases, the first fixed lens 16 will be unnecessary, either because space is not critical and a long focal length lens (long enough, for instance, to reach into a laser where its internal virtual waist is located) may be used for the adjustable single lens or because the input waist requirement of the second (final) optical system is of a size and accessibility not requiring the extra processing lens.

Wherever a lens is used in the example, a different focusing element, such as a mirror or catadioptric, could be used. Although positive lenses could be used throughout the system, negative lenses are not excluded, where appropriate.

This invention uses relatively few parts (one lens and a telescope, or two lenses and a telescope) to provide, easy, non-iterative adjustment of both waist diameter and waist position along a gaussian beam.

It should be seen that applicant has provided a matching optical system for gaussian beams which includes the combination of an afocal lens pair (telescope) with a single movable lens serving as an input to the telescope and, where desired, a fixed lens serving as an input processor to the movable lens. Such combination of optical elements gives the user the ability to choose output waist diameter and position independently and achieve the desired values with two simple adjustments not requiring iteration.

I claim:

1. A matching optical system for matching gaussian beams to another optical system comprising:
    emitting means for producing a beam of light having an axis;
    a first movable lens disposed on said axis remote from said emitting means for translation along said axis;
    a movable afocal lens pair disposed for translation along said axis said lens pair being located on said axis more remote from said emitting beam than said first movable lens and;
    said first movable lens disposed for receiving said light beam from said emitting means and providing an output having a waist whose diameter varies with the translation of said movable lens, said output serving as an input to said afocal lens pair, said afocal lens pair providing a second output waist whose position varies with the translation of said afocal lens but whose diameter remains constant irrespective of the translation of said afocal lens pair.

2. A matching optical system for gaussian beams as set forth in claim 1 wherein said afocal lens pair is a telescope.

3. A matching optical system for gaussian beams as set forth in claim 2 wherein said emitting means is an Argon laser source.

4. A matching optical system for gaussian beams as set forth in claim 3 including a fixed lens disposed along said axis of said beam adjacent to said emitting means for providing said light from said emitting means with an output waist of predetermined diameter.

5. A matching optical system for gaussian beams as set forth in claim 4 wherein said movable lens has a position range enabling said movable lens to be positioned approximately its focal length remote from the waist formed by said fixed lens.

6. A matching optical system for gaussian beams as set forth in claim 5 wherein said another optical system is a laser velocimeter.

7. A matching optical system for gaussian beams as set forth in claim 3 wherein said movable lens has a position range enabling said movable lens to be positioned approximately its focal length remote from the waist formed by said fixed lens.

8. A matching optical system for gaussian beams as set forth in claim 7 wherein said another optical system is a laser velocimeter.

9. A matching optical system for gaussian beams as set forth in claim 3 including a single lens disposed adjacent to said emitting means.

* * * * *